US012652237B2

(12) United States Patent
Uscumlic et al.

(10) Patent No.: US 12,652,237 B2
(45) Date of Patent: Jun. 9, 2026

(54) APPARATUSES, METHODS AND NON-TRANSITORY COMPUTER-READABLE STORAGE MEDIUMS FOR SERVICE COMMUNICATION PROXY INTERCONNECTION

(71) Applicant: Nokia Solutions and Networks Oy, Espoo (FI)

(72) Inventors: Bogdan Uscumlic, Orsay (FR); Yu-Chia Tseng, Massy (FR)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 188 days.

(21) Appl. No.: 18/496,337

(22) Filed: Oct. 27, 2023

(65) Prior Publication Data

US 2025/0141790 A1      May 1, 2025

(51) Int. Cl.
*H04L 45/302* (2022.01)
*H04L 45/12* (2022.01)
*H04L 45/586* (2022.01)

(52) U.S. Cl.
CPC ........ *H04L 45/3065* (2013.01); *H04L 45/123* (2013.01); *H04L 45/586* (2013.01)

(58) Field of Classification Search
CPC .. H04L 45/3065; H04L 45/123; H04L 45/586
See application file for complete search history.

(56) References Cited

U.S. PATENT DOCUMENTS

| | | | |
|---|---|---|---|
| 10,887,886 B2 | 1/2021 | Lee et al. | |
| 2008/0172732 A1* | 7/2008 | Li | H04L 12/4641 726/15 |
| 2020/0236110 A1* | 7/2020 | Metzler | H04L 63/10 |
| 2020/0280511 A1* | 9/2020 | Gapin | H04L 67/141 |

(Continued)

FOREIGN PATENT DOCUMENTS

| | | |
|---|---|---|
| CN | 114930902 B | 5/2023 |
| WO | 2021240055 A1 | 12/2021 |

OTHER PUBLICATIONS

5G Signaling. [Retrieved Oct. 27, 2023] Retrieved from the Internet <URL: https://www.nokia.com/networks/core/5g-core/5g-signaling/?did=d00000000608&gclid=EAIaIQobChMI8buFwK6k_gIVApBoCR3LCwSgEAAYAiAAEgL5O_D_BwE>.

(Continued)

*Primary Examiner* — Joseph G Ustaris
(74) *Attorney, Agent, or Firm* — Harness, Dickey & Pierce, P.L.C.

(57) ABSTRACT

A system for routing a service request in a network includes at least one processor and at least one memory storing instructions that, when executed by the processor, cause the system to receive a service request at a first service communication proxy (SCP), receive quality of service (QoS) requirements of the service request, and process, at the first SCP, the service request to determine a virtual path to route the service request from a first network function to a second network function within the network. The service request is received from the first network function and the first net- (Continued)

work function is associated with a data center of the first SCP. The virtual path is determined based on QoS parameters of the network and the QoS requirement of the service request.

19 Claims, 5 Drawing Sheets

(56)                    References Cited

U.S. PATENT DOCUMENTS

2023/0179518 A1*    6/2023    Vangala .................. H04L 45/70
                                                              709/238

OTHER PUBLICATIONS

What's a Service Mesh? [Jun. 29, 2018][Retrieved Oct. 27, 2023] Retrieved from the Internet <URL: https://www.redhat.com/en/topics/microservices/what-is-a-service-mesh>.

Klienfeld, Volker, et al,. Indirect communication for service-based architecture in 5G core. [Retrieved Oct. 27, 2023]. Retrieved from the Internet <URL:https://www.ericsson.com/en/reports-and-papers/white-papers/indirect-communication-for-service-based-architecture-in-5g-core>.

Bookham, Colin, et al,. An Architecture for Network Function Interconnect. [Aug. 12, 2023] [Retrieved Oct. 27, 2023]. Retrieved from the Internet <URL:https://datatracker.ietf.org/doc/draft-bookham-rtgwg-nfix-arch/>.

Dredge, Simon,. The Service Communication Proxy: 5G Caught Up in a Service Mesh. [Feb. 14, 2020] [retrieved Oct. 27, 2023]. Retrieved from the Internet <URL:https://www.linkedin.com/pulse/service-communication-proxy-5g-caught-up-mesh-simon-dredge>.

5G; System architecture for the 5G System (5GS). 3GPP TS 23.501 version 17.5.0 Release 17 (Jul. 2022).

5G; Procedures for the 5G System (5GS). 3GPP TS 23.502 v.17.4.0 Release 17.(May 2022).

Extended European Search Report Corresponding to Application No. 242012490, mailed Feb. 18, 2025.

* cited by examiner

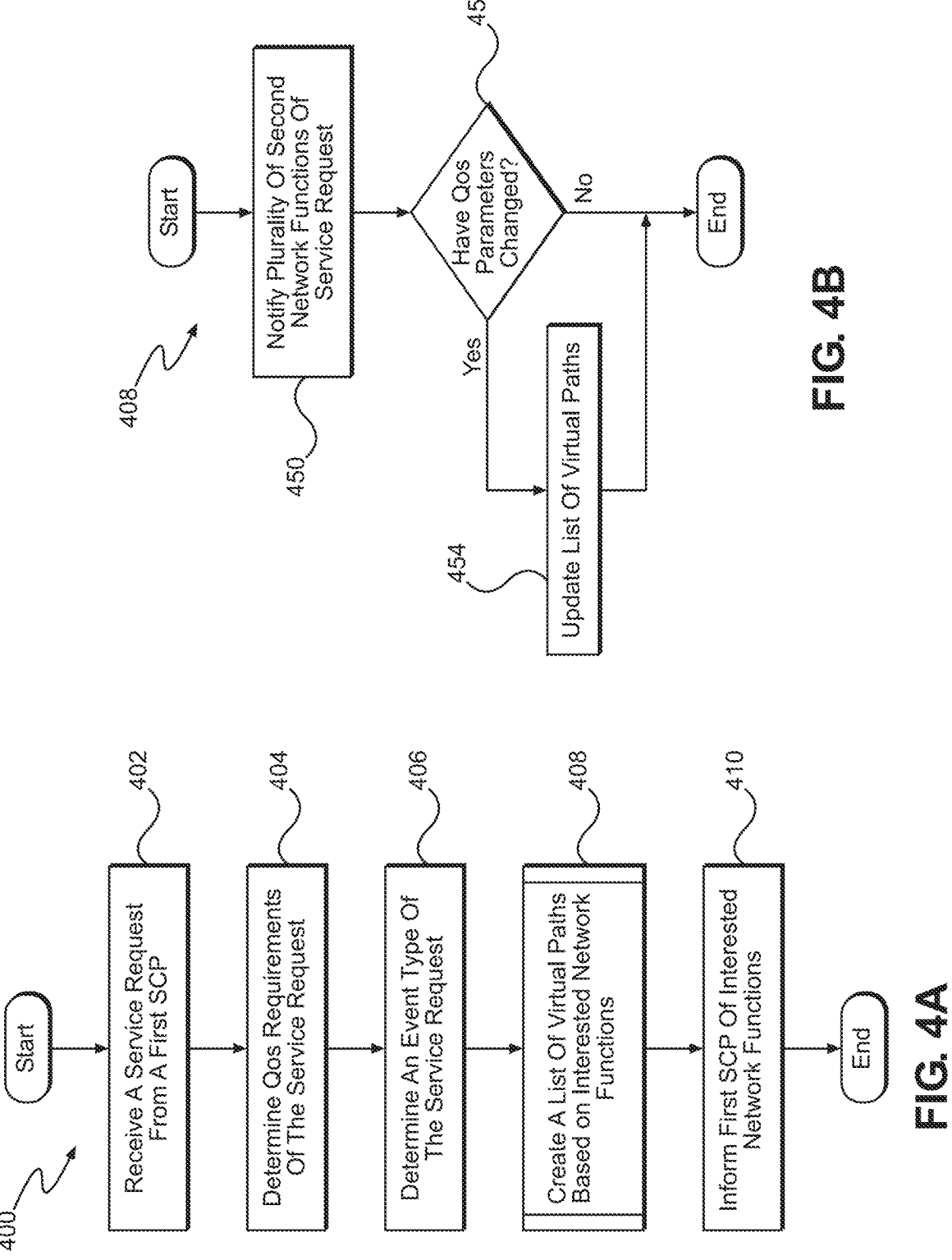

408

450 Notify Plurality Of Second Network Functions Of Service Request

452 Have Qos Parameters Changed?

No → End

Yes

454 Update List Of Virtual Paths

402 Receive A Service Request From A First SCP

404 Determine Qos Requirements Of The Service Request

406 Determine An Event Type Of The Service Request

408 Create A List Of Virtual Paths Based on Interested Network Functions

410 Inform First SCP Of Interested Network Functions

FIG. 4A

APPARATUSES, METHODS AND NON-TRANSITORY COMPUTER-READABLE STORAGE MEDIUMS FOR SERVICE COMMUNICATION PROXY INTERCONNECTION

TECHNICAL FIELD

One or more example embodiments relate to methods, apparatuses, and/or non-transitory computer-readable storage mediums for providing interconnection between one or more service communication proxies (SCPs) of a network.

BACKGROUND

A network may include one or more service communication proxies (SCPs) each of which includes a data center with one or more network functions. Each network function within the network may be configured to transmit service requests to network functions within the network to perform the service request.

SUMMARY

The scope of protection sought for various example embodiments is set out by the independent claims. The example embodiments and/or features, if any, described in this specification that do not fall under the scope of the independent claims are to be interpreted as examples useful for understanding various embodiments.

In at least one example embodiment a system for routing a service request in a network includes at least one processor and at least one memory. The at least one memory may store instructions that, when executed by the at least one processor, may cause the system to receive a service request at a first service communication proxy (SCP), receive quality of service (QoS) requirements of the service request, and process, at the first SCP, the service request to determine a virtual path to route the service request from the first network function to a second network function within the network. The service request may be received from a first network function and the first network function may be associated with a data center of the first SCP. The virtual path may be determined based on QoS parameters of the network and the QoS requirement of the service request.

In at least one example embodiment, the at least one memory may store instructions that, when executed by the at least one processor, cause the system to receive, from a SCP repository, a list of virtual paths. Each virtual path may define a route for the service request from the first network function to a final network function within the network. In at least one example embodiment, the at least one memory may store instructions that, when executed by the at least one processor, cause the system to determine the virtual path by selecting a first virtual path from the list of virtual paths that satisfies the QoS parameters and the QoS requirements of the service request.

In at least one example embodiment, the at least one memory may store instructions that, when executed by the at least one processor, cause the system to receive a list of updated virtual paths defining routes for the service request from the first network function to a final network function when the QoS parameters for the network are updated and determine an updated virtual path, from the list of updated virtual paths, to route the service request from the first network function to the second network function within the network. In at least one example embodiment, the QoS parameters may be updated when the service request changes a number or type of a network function within the network. The service request may change a QoS parameter of a SCP of the network by a threshold percentage, or a topology of the network changes.

In at least one example embodiment, the at least one memory may store instructions that, when executed by the at least one processor, cause the system to establish a connection between the first network function and the second network function to carry out the service request.

In at least one example embodiment, the QoS parameters include at least one of a number of hops, jitter, latency, or packet loss.

In at least one example embodiment a method for routing a service request in a network may include receiving a service request at a first service communication proxy (SCP), receiving quality of service (QoS) requirements of the service request, and processing, at the first SCP, the service request to determine a virtual path to route the service request from the first network function to a second network function within the network. The service request may be received from a first network function and the first network function may be associated with a data center of the first SCP. The virtual path may be determined based on QoS parameters of the network and the QoS requirement of the service request.

In at least one example embodiment, the method may include receiving, from a SCP repository, a list of virtual paths. Each virtual path may define a route for the service request from the first network function to a final network function within the network. In at least one example embodiment, the method may include determining the virtual path by selecting a first virtual path from the list of virtual paths that satisfies the QoS parameters and the QoS requirements of the service request.

In at least one example embodiment, the method may include receiving a list of updated virtual paths defining routes for the service request from the first network function to a final network function when the QoS parameters for the network are updated and determine an updated virtual path, from the list of updated virtual paths, to route the service request from the first network function to the second network function within the network. In at least one example embodiment, the QoS parameters may be updated when the service request changes a number or type of a network function within the network. The service request may change a QoS parameter of a SCP of the network by a threshold percentage, or a topology of the network changes.

In at least one example embodiment, the method may include establishing a connection between the first network function and the second network function to carry out the service request.

In at least one example embodiment, the QoS parameters include at least one of a number of hops, jitter, latency, or packet loss.

Also described herein is a non-transitory computer-readable storage medium storing computer-executable instruction that, when executed by the at least one processor of a system, may cause the system to perform a method for routing a service request in a network. The method may include receiving a service request at a first service communication proxy (SCP), receiving quality of service (QoS) requirements of the service request, and processing, at the first SCP, the service request to determine a virtual path to route the service request from the first network function to a second network function within the network. The service request may be received from a first network function and the first network function may be associated with a data center of the first SCP. The virtual path may be determined based on QoS parameters of the network and the QoS requirement of the service request.

At least one other example embodiment provides a network element for routing a service request in a network. The network element may include means for receiving a service request at a first service communication proxy (SCP), receiving quality of service (QoS) requirements of the service request, and processing, at the first SCP, the service request to determine a virtual path to route the service request from the first network function to a second network function within the network. The service request may be received from a first network function and the first network function may be associated with a data center of the first SCP. The virtual path may be determined based on QoS parameters of the network and the QoS requirement of the service request.

In at least one example embodiment a system for routing a service request in a network includes at least one processor and at least one memory. The at least one memory may store instructions that, when executed by the at least one processor, may cause the system to receive a service request at a service communication proxy (SCP) repository, the service request being received from a first SCP, process, at the SCP repository, the service request to determine quality of service (QoS) requirements of the service request and an event type created by the service request, determine a list of virtual paths based on QoS parameters of the network and the QoS requirements of the service request, and send the list of virtual paths from the SCP repository to the first SCP. Each virtual path may define a route for the service request from a first network function of the first SCP to one of a plurality of second network functions within the network.

In at least one example embodiment, the at least one memory may store instructions that, when executed by the at least one processor, cause the system to notify the plurality of second network functions within the network of the service request. In at least one example embodiment, the at least one memory may store instructions that, when executed by the at least one processor, cause the system to create an updated list of virtual paths based on updated QoS parameters for the network, and send the updated list of virtual paths to at least the first SCP. In at least one example embodiment, the QoS parameters may be generated when the service request changes a number or type of a network function within the network. The service request may change a QoS parameter of a SCP of the network by a threshold percentage, or a topology of the network changes. In at least one example embodiment, the updated list of virtual paths are created using a machine learning algorithm.

In at least one example embodiment, the QoS parameters include at least one of a number of hops, jitter, latency, or packet loss.

Also describe herein is a method for routing a service request in a network. The method may include receiving a service request at a service communication proxy (SCP) repository, the service request being received from a first SCP, processing, at the SCP repository, the service request to determine quality of service (QoS) requirements of the service request and an event type created by the service request, determining a list of virtual paths based on QoS parameters of the network and the QoS requirements of the service request, and sending the list of virtual paths from the SCP repository to the first SCP. Each virtual path may define a route for the service request from a first network function of the first SCP to one of a plurality of second network functions within the network.

Also described herein is a non-transitory computer-readable storage medium storing computer-executable instruction that, when executed by the at least one processor of a system, may cause the system to perform a method for routing a service request in a network. The method may include receiving a service request at a service communication proxy (SCP) repository, the service request being received from a first SCP, processing, at the SCP repository, the service request to determine quality of service (QoS) requirements of the service request and an event type created by the service request, determining a list of virtual paths based on QoS parameters of the network and the QoS requirements of the service request, and sending the list of virtual paths from the SCP repository to the first SCP. Each virtual path may define a route for the service request from a first network function of the first SCP to one of a plurality of second network functions within the network.

At least one other example embodiment provides a network element for routing a service request in a network. The network element may include means for receiving a service request at a service communication proxy (SCP) repository, the service request being received from a first SCP, processing, at the SCP repository, the service request to determine quality of service (QoS) requirements of the service request and an event type created by the service request, determining a list of virtual paths based on QoS parameters of the network and the QoS requirements of the service request, and sending the list of virtual paths from the SCP repository to the first SCP. Each virtual path may define a route for the service request from a first network function of the first SCP to one of a plurality of second network functions within the network.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of this disclosure.

FIG. 4A is a flow chart illustrating a method of routing a service request between network functions according to example embodiments.

FIG. 4B is a flow chart illustrating a method of creating a list of virtual paths within the network of the method of FIG. 4A according to example embodiments.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. The example embodiments may, however, be embodied in many alternate forms and should not be construed as limited to only the embodiments set forth herein.

It should be understood that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

While one or more example embodiments may be described from the perspective of a function or network element such as a network function, service communication proxy (SCP), data center, etc., it should be understood that one or more example embodiments discussed herein may be performed by one or more processors (or processing circuitry) at the applicable device, apparatus, or system. For example, according to one or more example embodiments, at least one memory may store instructions that, when executed by one or more processors, cause the SCP, data center, network function, or the like, to perform the operations discussed herein.

As discussed herein, the term "mechanism," in addition to its plain and ordinary meaning, may refer to methods, apparatuses and/or non-transitory computer readable storage mediums where applicable.

As discussed herein, the terminology "one or more" and "at least one" may be used interchangeably.

It will be appreciated that a number of example embodiments may be used in combination.

One or more example embodiments provide mechanisms to enable interconnectivity between two or more network functions of a network based on a service request of a first network function. The interconnectivity may be based on quality of service (QoS) requirements of the service request and QoS parameters of the network.

Figure 1:
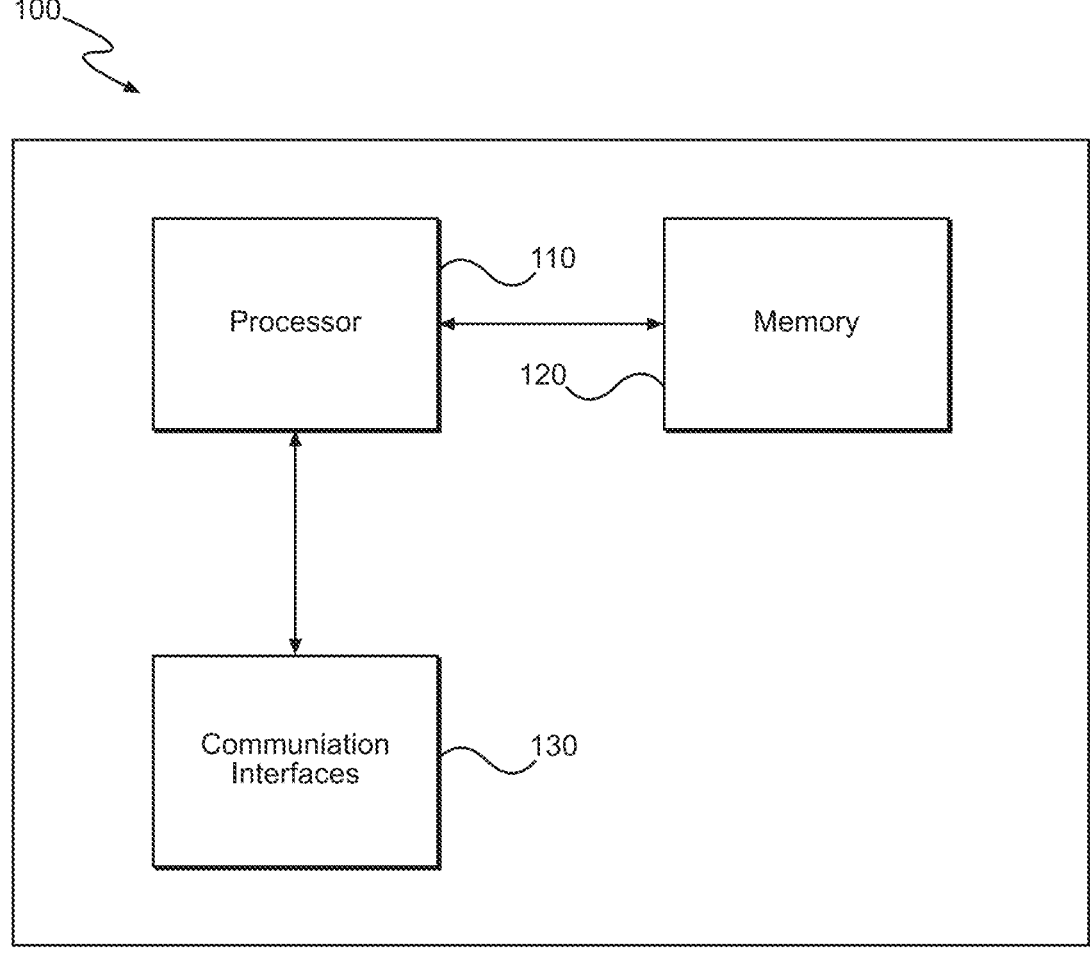
FIG. 1 illustrates an example embodiment of a system that may implement the methods of service communication proxy (SCP) interconnectivity described herein.

FIG. 1 illustrates an example embodiment of a system 100 that may implement the SCP, the data centers, and/or the network functions described herein.

As shown, the system 100 includes: a processor 110, a memory 120 connected to the processor 110, and various communication interfaces 130 connected to the processor 110. The various communication interfaces 130 may constitute a transceiver for transmitting/receiving data from/to other network elements (e.g., network functions, data centers, SCPs, etc.). As will be appreciated, depending on the implementation of the system 100, the system 100 may include many more components than those shown in FIG. 1. However, it is not necessary that all of these generally conventional components be shown in order to disclose the illustrative example embodiment. For example purposes, the example embodiment shown in FIG. 1 will be discussed with regard to the processor 110. However, it should be understood that the system 100 shown in FIG. 1 may include one or more processors or other processing circuitry, such as one or more Application Specific Integrated Circuits (ASICs).

The memory 120 may be a computer readable storage medium that generally includes a random access memory (RAM), read only memory (ROM), and/or a permanent mass storage device, such as a disk drive. The memory 120 may also store an operating system and any other routines/modules/applications for providing the functionalities of the system 100 (including UPF, CPF, MPF, etc.) to be executed by the processor 110. These software components may also be loaded from a separate computer readable storage medium into the memory 120 using a drive mechanism (not shown). Such separate computer readable storage medium may include a disc, tape, DVD/CD-ROM drive, memory card, or other like computer readable storage medium (not shown). In some example embodiments, software components may be loaded into the memory 120 via one of the various communication interfaces 130, rather than via a computer readable storage medium.

The processor 110 or other processing circuitry may be configured to carry out instructions of a computer program by performing the arithmetical, logical, and input/output operations of the system. Instructions may be provided to the processor 110 by the memory 120.

The various communication interfaces 130 may be wired and may include components that interface the processor 110 with the other input/output components. As will be understood, the various communication interfaces 130 and programs stored in the memory 120 to set forth the special purpose functionalities of the system 100 will vary depending on the implementation of the network node.

The various communication interfaces 130 may also include one or more user input devices (e.g., a keyboard, a keypad, a mouse, or the like) and user output devices (e.g., a display, a speaker, or the like).

Figure 2:
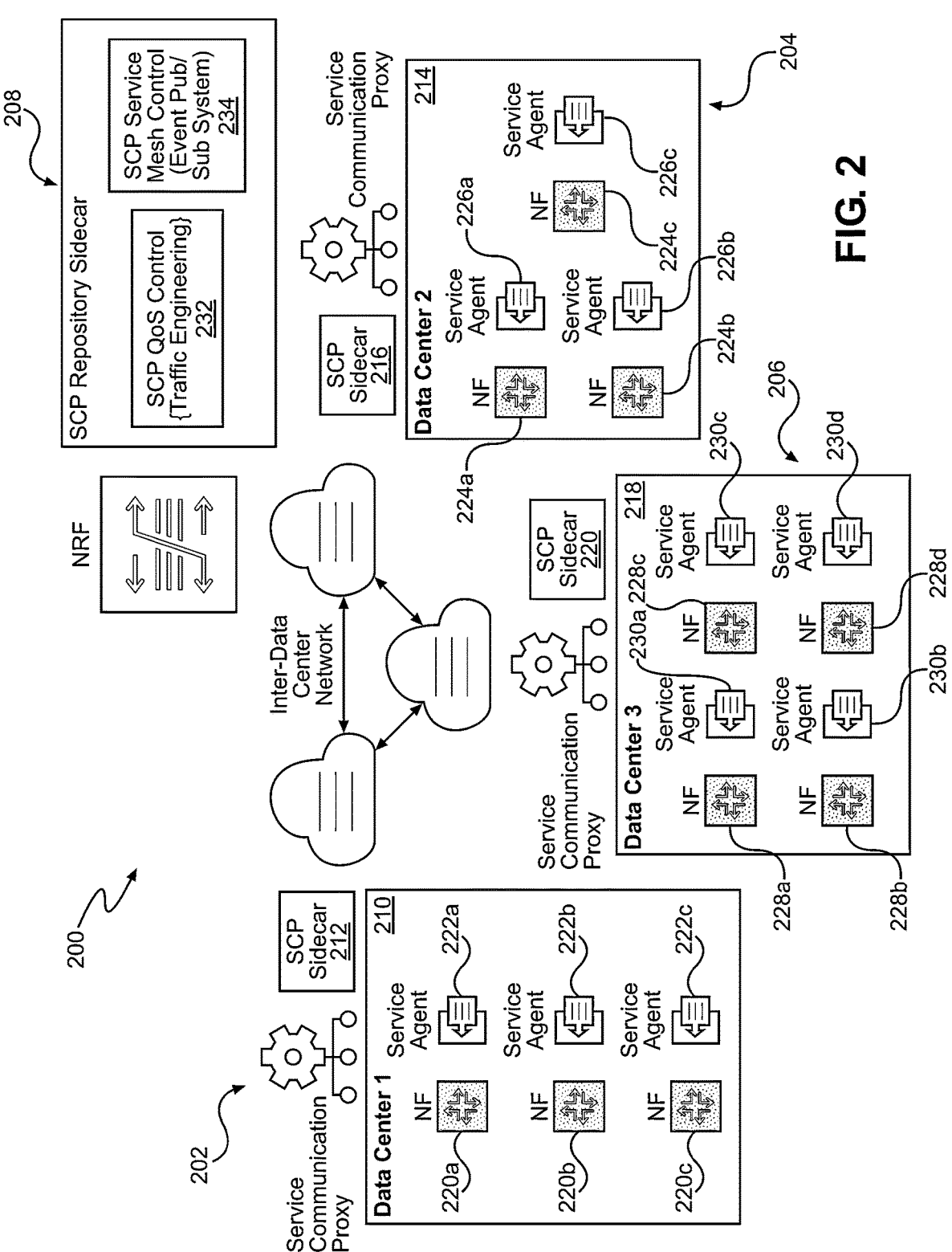
FIG. 2 illustrates an example embodiment of a network including multiple SCPs, according to example embodiments.

FIG. 2 illustrates a network 200 according to an example embodiment. The network 200 may also be referred to herein as a service based architecture. In at least one example embodiment, the network may include one or more SCPs such as a first SCP 202, a second SCP 204, and a third SCP 206. The one or more SCPs may be communicatively coupled via an inter-data center network that facilitates communication via virtual paths between the one or more SCPs. The network may also include an SCP repository 208 that may be in communication with each of the SCPs of the network 200. The SCP repository 208 is also referred to herein as an SCP repository sidecar.

The one or more SCPs of the network 200 may allow an access network, such as fifth generation technology (5G), to achieve cloud scalability in the deployment of network functions. The one or more SCPs may also enable a more efficient network function instance operation by focusing on an exchange of microservice databases and activity updates. To ensure that QoS guarantees are met, the one or more SCPs may be interconnected. In particular, the network 200 may include the SCP repository 208 which is configured to control traffic engineering as well as event communication. The one or more SCPs may be configured to communicate with the SCP repository 208 to find a path within the network 200 to route traffic based on the QoS guarantees.

Each SCP of the network 200 such as the first SCP 202, the second SCP 204, and the third SCP 206, may include a data center and a communication element. Each communication element may be referred to herein as an SCP sidecar.

For example, the first SCP 202 may include a first data center 210 and a first SCP sidecar 212, the second SCP 204 may include a second data center 214 and a second SCP sidecar 216, and the third SCP 206 may include a third data center 218 and a third SCP sidecar 220.

Each data center may include one or more network functions, which may each correspond to a service agent. A network function may be a function that is executed by a network infrastructure element. For example, a network function may be a load-balancer, a firewall, a router, a user plane function (UPF), and/or a multiprotocol label switching (MPLS) router. A service agent may be part of an SCP implementation and may be allocated to a network function to facilitate execution of additional or peripheral tasks required for the network function. A service agent may perform various functions such as facilitating communication, load-balancing, cryptography and/or security.

In at least one example embodiment, the first data center 210 may include first network functions 220a, 220b, and 220c corresponding to first service agents 222a, 222b, and 222c, the second data center 214 may include second network functions 224a, 224b, and 224c corresponding to second service agents 226a, 226b, and 226c, and the third data center 218 may include third network functions 228a, 228b, and 228c corresponding to third service agents 230a, 230b, and 230c.

The one or more network functions may be configured to generate service requests to be communicated through the network 200. In at least one example embodiment, a service request of a network function may be communicated through the network in order to fulfill the service request. A service request may be a demand for an exchange of data between different microservices such as different network functions within a cloud and/or different clouds. For example, network functions may be telecommunication microservices. When network functions are telecommunication microservices, an exchange of data may last for a period of time. Thus, a service request between network functions may be equivalent to interconnecting different network functions to facilitate more complex telecommunication functions. For example, a service request may relate to interconnecting an AMF and a session management function (SMF) in a 5G network.

In at least one example embodiment, the network function 220a of the first SCP 202 may have a service request that may be capable of being fulfilled by a network function of the second SCP 204 such as the second network function 224a. In at least one example embodiment, a network function may be chosen to fulfill a particular service request based on statistical QoS parameters such as jitter and latency and/or deterministic QoS parameters such as deterministically limited jitter and deterministically limited latency. Each of the first SCP sidecar 212, the second SCP sidecar 216, and the third SCP sidecar 220 may be a communication bridge between the corresponding SCP and the SCP repository 208. In at least one example embodiment, each of the first SCP sidecar 212, the second SCP sidecar 216, and the third SCP sidecar 220 may include a path computation element that may be configured to determine a path for a service request based on QoS parameters.

The SCP repository 208 may include a QoS control module 232 and a service mesh control module 234. The QoS control module 232 may store QoS properties of virtual paths that may connect the one or more SCPs within the inter-data center network. The QoS control module 232 may also collect QoS requirements of the network 200 such as QoS requirements of different network function producers and/or consumers based on different criteria. Criteria may include mobility, geographic position, and/or type of 5G QoS. The QoS control module 232 may be configured to update or recalculate the virtual paths that connect the one or more SCPs based on updates or changes to the QoS requirements of the network 200. The QoS control module 232 may communicate with one or more of the one or more SCPs to update the virtual paths. In at least one example embodiment, recalculating the virtual paths may involve using at least one machine learning model or may involve an optimization algorithm.

The service mesh control module 234 may be configured to propagate all events during a service request to microservices with the network 200 that may be interested in using information from the service request. In at least one example embodiment, the microservices within the network 200 may be different network functions that may be supported by a corresponding service agent. This may allow network functions within the network 200 to be suggested to the network function of the service request when selecting a path for network function interconnection based on the QoS criteria of the service request.

Figure 3A:
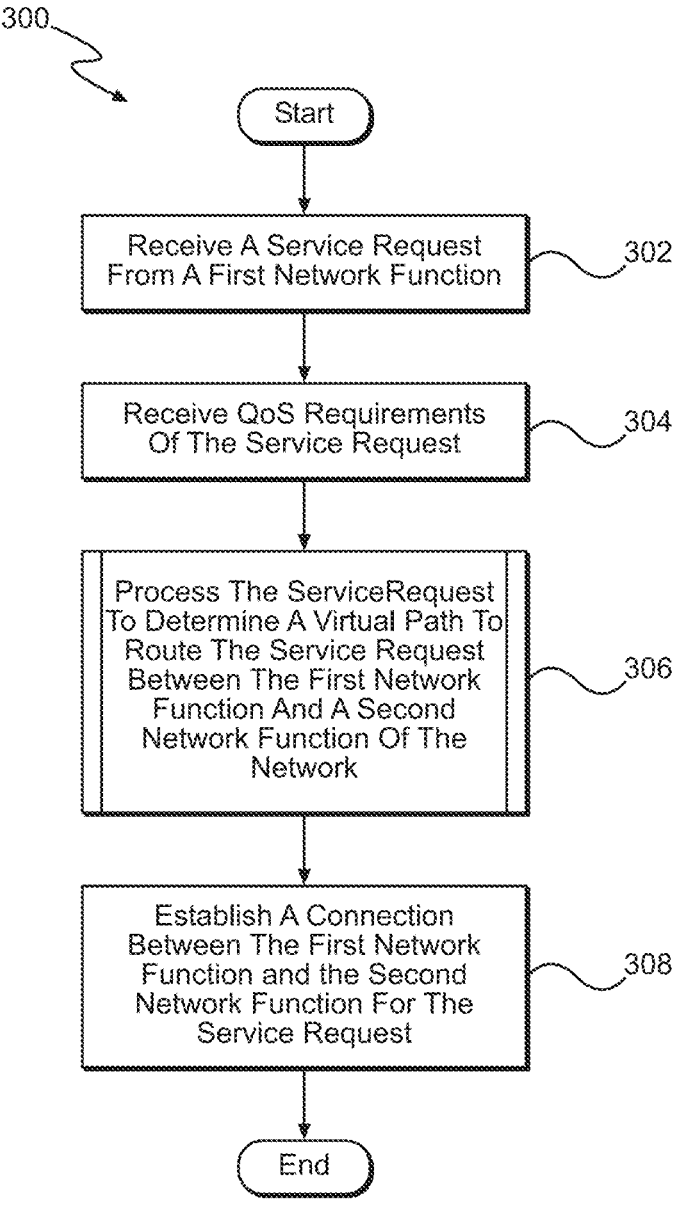
FIG. 3A is a flow chart illustrating a method of routing a service request between network functions according to example embodiments.

FIG. 3A is a flow chart of a method of routing a service request by an SCP between network functions according to example embodiments. For example purposes, the example embodiment shown in FIG. 3A will be discussed with regard to the architecture shown in FIG. 1. For example, an SCP may include the processor 110 and the memory 120 to carry out the method of FIG. 3A. It should be understood, however, that example embodiments should not be limited to this example.

At step 302, the processor 110 may receive a service request from a first network function of the SCP. The service request may be a request that is capable of being fulfilled by another network function of a network including the SCP such as the network 200.

At step 304, the processor 110 may receive QoS requirements of the service request. The QoS requirements of the service request may include a maximum allowed set of hops, a maximum allowed accumulated latency, a maximum allowed accumulated jitter, a maximum allowed packet loss, a maximum allowed bandwidth, and/or additional requirements related to latency, jitter and/or bandwidth.

At step 306, the processor 110 may process the service request to determine a virtual path to route the service request between the first network function and a second network function of the network 200. Additional details of processing the service request to determine a virtual path are described below with reference to FIG. 3B.

At step 308, the processor 110 may establish a connection between the first network function and the second network function in order to fulfill the service request of the first network function. For example, the service request may be routed from the first network function to the second network function that is selected via the virtual path of the network 200.

Figure 3B:
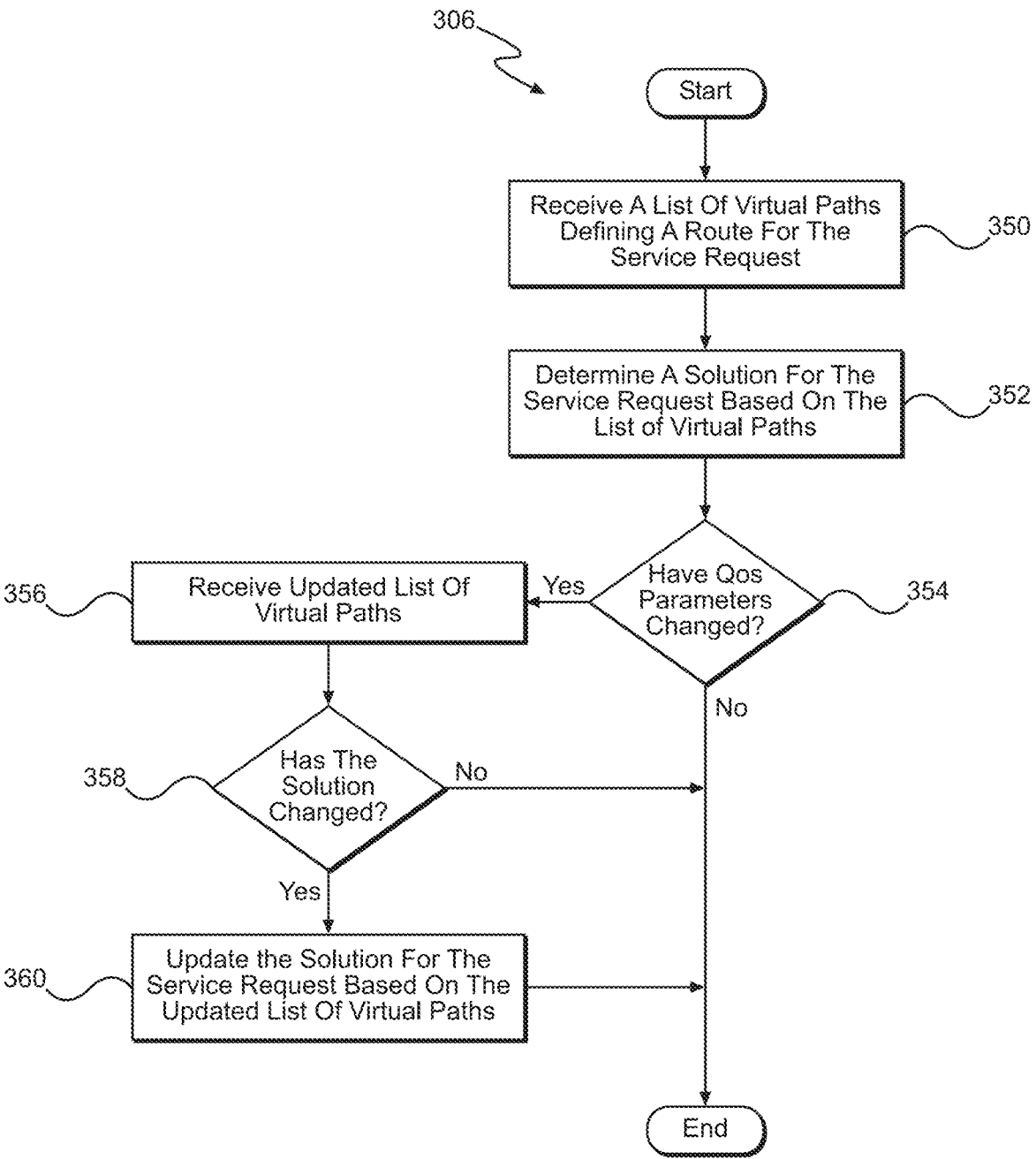
FIG. 3B is a flow chart illustrating a method of processing a service request of the method of FIG. 3A according to example embodiments.

FIG. 3B is a flow chart of a method of the step 306 of processing the service request of FIG. 3A, according to an example embodiment. For example purposes, the example embodiment shown in FIG. 3B will be discussed with regard to the architecture shown in FIG. 1. It should be understood, however, that example embodiments should not be limited to this example.

The method of step 306 may start at step 350 when the processor 110 receives a list of virtual paths defining a route for the service request. The list of virtual paths may be received from the SCP repository 208. Each virtual path may define a route for the service request from the first network function to a final network function within the network 200.

At step 352 the processor 110 determines a solution for the service request based on the list of virtual paths. The solution for the service request may be a path among the list of virtual paths that is received from the SCP repository. In at least one example embodiment, the solution may be a virtual path that satisfies both QoS parameters of the network 200 and QoS requirements of the service request. As described above, QoS parameters of the system may be statistical QoS parameters such as jitter and latency and/or deterministic QoS parameters such as deterministically limited jitter and deterministically limited latency. QoS requirements of the service request may be requirements of individual network function producers or consumers based on different criteria such as mobility, geographic position, and/or type of 5G QoS.

In at least one example embodiment, a solution for the service request may be a solution that satisfies QoS parameters of the network 200 and QoS requirements of a service request from a network function better than other (e.g., every other) potential solution of the list of virtual paths. In at least one example embodiment, an algorithm may be used to determine the solution for the service request. The algorithm may include a plurality of input parameters such as a set of previously known traffic demands between network functions of the network 200, the list of virtual paths for routing traffic between the first network and different network functions of the network 200, a set of weights defining an importance of different QoS criteria in a virtual path selection, a matrix that includes a mapping of known traffic demands to a virtual path, and a traffic demand for communication between network functions that needs to be supported by a virtual path.

In at least one example embodiment, the algorithm may determine a measurement for each virtual path that describes how well the virtual path supports the service request. The measurement may be determined based on a set of weights, which define an importance of different QoS parameters and requirements for the virtual path. For example, for a first virtual path, a measurement may be calculated by multiplying a weight of a first QoS criteria by the difference of a maximum QoS criteria for the service request and a QoS criteria defined by the virtual path. In particular, a measurement R for a virtual path v and a service request to may be defined by: $R(v,t_0)=w(L)(L_{r0}-L_v)+w(\Delta)(\Delta_{r0}-\Delta_v)+w(J)(J_{r0}-J_v)+w(PL)(PL_{r0}-PL_v)+w(BW)(BW_v-BW_{r0})$. $w(L)$ may be a weight of a QoS criteria related to links, $w(\Delta)$ may be a weight of a QoS criteria related to latency, $w(J)$ may be a weight of a QoS criteria related to jitter, $w(PL)$ may be a weight of a QoS criteria related to packet loss, and $w(BW)$ may be a weight of a QoS criteria related to bandwidth. The weights may be defined based on the service request or may be general to the network 200. $L_{r0}$ may be a maximum allowed set of hops, $\Delta_{r0}$ may be a maximum allowed accumulated latency, $J_{r0}$ may be the maximum allowed accumulated jitter, $PL_{r0}$ may be the maximum allowed packet loss, and $BW_{r0}$ may be the maximum allowed bandwidth. $L_v$ may be a set of links or hops defined by the virtual path, $\Delta_v$ may be a latency defined by the virtual path, $J_v$ may be jitter defined by the virtual path, $PL_v$ may be a packet loss defined by the virtual path, and $BW_v$ may be the bandwidth of the virtual path. A measurement may be defined by each virtual path that can be used to satisfy the service request and a measurement that has a highest measurement may be determined to be the solution for the service request.

In at least one example embodiment, the solution may be determined by a machine learning algorithm. The machine learning algorithm may be configured to determine a solution of the list of virtual paths that satisfies different QoS criteria such as the QoS parameters and the QoS requirements. In at least one example embodiment, the machine learning algorithm may be configured to calculate a measurement for each virtual path and select a virtual path that maximizes the measurement as described above.

At conditional step 354 the processor 110 determines if QoS parameters of the network 200 have changed. For example, if either the statistical QoS parameters such as jitter and latency and/or deterministic QoS parameters such as deterministically limited jitter and deterministically limited latency have been updated or modified, the QoS parameters of the network 200 may have changed. A change in QoS parameters may also occur if a service request is new, for example, if a service request involves a change in a type or number of network function instances or a change in a location of network function instances. Additionally, if a service request strengthens a QoS requirement of one or more SCPs by a threshold percentage, the QoS parameters of the network 200 may have changed. Further, a change in QoS parameters of the network 200 may occur upon a change to a topology of the network such as an addition of links, nodes, and/or data centers to the network 200.

If the QoS parameters have not changed, the method of FIG. 3B ends. If the QoS parameters have changed, the method proceeds to step 356.

At step 356 the processor 110 receives an updated list of virtual paths. The list of updated virtual paths may be received from the SCP repository 208. Each updated virtual path may define a route for the service request from the first network function to a final network function within the network 200 based on the updated QoS parameters for the network 200.

At conditional step 358 the processor 110 determines if the solution has changed based on the updated list of virtual paths. If the solution has not changed, the method of FIG. 3B may end. If the solution has changed, at step 360 the processor may update the solution for the service request based on the updated list of virtual paths. As described above, the solution may satisfy both the updated QoS parameters of the network 200 and QoS requirements of the service request. In at least one example embodiment, the solution may be determined by the algorithm as described above.

FIG. 4A is a flow chart of a method of routing a service request by an SCP repository between network functions, according to example embodiments. For example purposes, the example embodiment shown in FIG. 4A will be discussed with regard to the architecture shown in FIG. 1. It should be understood, however, that example embodiments should not be limited to this example.

At step 402, the processor 110 of an SCP repository such as the SCP repository 208 may receive a service request from an SCP of the network 200. As described above, the service request may be from a first network function of the SCP. The service request may be a request that is capable of being fulfilled by another network function of the network including the SCP such as the network 200.

At step 404 the processor 110 may determine QoS requirements of the service request. As described above, QoS requirements of the service request may be requirements of individual network function producers or consumers based on different criteria such as mobility, geographic position, and/or type of 5G QoS.

At step 406 the processor 110 may determine a type of event of the service request. The type of event depends on the network function that is attempting to establish communication. For example, if an AMF wants to connect with an SMF in a 5G network, this may be considered an event and may be recognized by the SCP service mesh control module 234. Additional types of events may include a gNodeB (gNB) function wanting to connect with an AMF or a network function with a load-balancer wanting to connect to a network function with a firewall. An event may be observed as a consequence of a service request. For example, if a service request happens, this may create an event of a particular type, which may cause any network function that may be impacted to be notified as explained in further detail below. The SCP service mesh control module 234 may detect an event without the event interacting with the network in at least some example embodiments.

The processor 110 may register the event to a local database of events that may be stored in the SCP repository 208. In particular, the local database of events may be stored in the SCP service mesh control module 234. The SCP repository may use the local database of events for efficient handling of asynchronous microservice communication within the network 200. For example, the SCP service mesh control module 234 may ensure relatively low complexity of microservice communication, which may be required for microservice independent operation.

At step 408, the processor 110 may create a list of virtual paths to route the service request within the network 200. The step 408 is described below with further detail in FIG. 4B.

At step 410, the processor 110 may inform the first SCP of interested network functions to carry out the service request. In at least one example embodiment, the processor 110 may inform the first SCP by sending a list of virtual paths capable of routing the service request. As described above, once the SCP has the list of virtual paths, a path may be selected based on QoS criteria including the QoS parameters and the QoS requirements to route the service request from the first SCP to a second SCP of the network 200 to fulfill the service request. For example, if the service request relates to interconnecting an AMF and an SMF in a 5G network, the successful interconnection of the AMF and the SMF may fulfill the service request.

FIG. 4B is a flow chart illustrating a method of creating a list of virtual paths within the network of the step 408 of the method of FIG. 4A. For example purposes, the example embodiment shown in FIG. 4B will be discussed with regard to the architecture shown in FIG. 1. It should be understood, however, that example embodiments should not be limited to this example.

The method of the step 408 may start at step 450 when the processor 110 notifies a plurality of second network functions of the service request. The plurality of second network functions that are notified may be network functions of any SCP within the network 200. Additionally, the plurality of second network functions may be capable of fulfilling the service request of the first SCP.

At conditional step 452, the processor 110 determines whether QoS parameters of the network 200 have changed. If the QoS parameters have not changed, then the method of step 408 ends and the processor 110 may proceed to inform the first SCP of interested network functions to fulfill the service request.

If the QoS parameters have changed, at step 454 the processor 110 updates the list of virtual paths capable of routing the service request. As described in FIG. 3B, the updated list of virtual paths is determined by the SCP repository 208. In at least one example embodiment, the first SCP may be capable of determining the list of updated virtual paths. For example, in a network 200 that includes only a few (e.g., two or three) data centers and thus has a limited number of paths, the first SCP may be capable of calculating the updated list of virtual paths. The first SCP must have the hardware processing power in order to be capable of calculating the updated list of virtual paths. In networks that include many data centers and a large number of paths, the SCP repository may calculate the updated list of virtual paths.

In at least one example embodiment, an algorithm may be used to calculate the updated list of virtual paths. The algorithm may include a plurality of input parameters such as the list of virtual paths for routing traffic between the first network and different network functions of the network 200, a set of weights defining an importance of different QoS criteria in a virtual path selection, and a set of previously known traffic demands between network functions of the network 200. The algorithm may output a matrix that includes a mapping of traffic demands to a virtual path which may be the updated list of virtual paths.

In at least one example embodiment, the algorithm may include a preselection phase. In the preselection phase, a measurement may be calculated for the service request based on the set of weights and the QoS criteria. For example, the measurement may be determined by the equation: $S(t)=w(L)L_t+w(\Delta)\Delta_t+w(J)J_t+w(PL)PL_t+w(BW)BW_t$. Similar to the equation described above, for a service request t, $w(L)$ may be a weight of a QoS criteria related to links, $w(\Delta)$ may be a weight of a QoS criteria related to latency, $w(J)$ may be a weight of a QoS criteria related to jitter, $w(PL)$ may be a weight of a QoS criteria related to packet loss, and $w(BW)$ may be a weight of a QoS criteria related to bandwidth. The weights may be defined based on the service request or may be general to the network 200. $L_{t0}$ may be a maximum allowed set of hops, $\Delta_{t0}$ may be a maximum allowed accumulated latency, $J_{t0}$ may be the maximum allowed accumulated jitter, $PL_{t0}$ may be the maximum allowed packet loss, and $BW_{t0}$ may be the maximum allowed bandwidth. In at least one example embodiment, the SCP repository may calculate a measurement for additional service requests based on the updated QoS parameters so that a set of measurements if acquired for potential service requests or traffic demands of the network 200.

Then the algorithm may determine a measurement for each virtual path v of a set of virtual paths for routing the service request t. This measurement may be analogous to the calculation described above. In particular, a measurement R for a virtual path v and a service request t may be defined by: $R(v,t)=w(L)(L_t-L_v)+w(\Delta)(\Delta_t-\Delta_v)+w(J)(J_t-J_v)+w(PL)(PL_t-PL_v)+w(BW)(BW_v-BW_t)$. $w(L)$ may be a weight of a QoS criteria related to links, $w(\Delta)$ may be a weight of a QoS criteria related to latency, $w(J)$ may be a weight of a QoS criteria related to jitter, $w(PL)$ may be a weight of a QoS criteria related to packet loss, and $w(BW)$ may be a weight of a QoS criteria related to bandwidth. The weights may be defined based on the service request or may be general to the network 200. $L_t$ may be a maximum allowed set of hops, $\Delta_t$ may be a maximum allowed accumulated latency, $J_t$ may be the maximum allowed accumulated jitter, $PL_t$ may be the maximum allowed packet loss, and $BW_t$ may be the maximum allowed bandwidth. $L_v$ may be a set of links or hops defined by the virtual path, $\Delta_v$ may be a latency defined by the virtual path, $J_v$ may be jitter defined by the virtual path, $PL_v$ may be a packet loss defined by the virtual path, and $BW_v$ may be the bandwidth of the virtual path. A measurement may be defined by each virtual path that can be used to satisfy the service request. Each of these measurements and virtual paths may be added to a matrix that includes a mapping of traffic demands to a virtual path. The matrix may be the updated list of virtual paths.

In at least one example embodiment, the algorithm may additionally be configured to remove traffic demand equivalents. The set of measurements of traffic demands may be sorted based on their latency requirements, $\Delta_r$. Then, for each traffic demand, if there is an equivalent traffic demand, that traffic demand and virtual path may be removed from the matrix. Removing traffic demands may be useful when there are many equivalents for a traffic demand. However, removing equivalents is not necessary.

In at least one example embodiment, the algorithm may additionally be configured to fine tune the matrix to decrease total latency of the network 200. For example, a total latency LAT of all virtual paths used for routing traffic demands within the network 200 may be calculated. Then, the traffic demands for the network 200 may be sorted in increasing order of their bandwidth requirements. Then, for each traffic demand, the virtual paths for that traffic demand may be sorted in decreasing order of bandwidth capacity $BW_v$. For each virtual path of the set of virtual paths, a total latency LAT' for all virtual paths is calculated if the service request is routed via the selected virtual path. If the total latency for the network 200 with the service request routed via the selected virtual path LAT' is less than the total latency of the system LAT then the matrix is updated with the remaining available bandwidth of the network 200. If the total latency for the network 200 with the service request routed via the selected virtual path LAT' is not less than the total latency of the system LAT then the matrix is not updated and the next virtual path is selected.

The matrix will include an updated list of virtual paths that may be configured to route the service request from the first network function. After the updated list of virtual paths is determined, the updated list may be sent from the SCP repository to the first SCP to determine a solution for the service request as described above.

The systems and methods described above describe a QoS-capable service mesh for service request interoperability. The service mesh may allow for QoS guarantees for interconnection within the network 200. The systems and methods may allow constant improvement of the QoS properties of the network function interconnections based on the virtual paths being constantly recalculated by the algorithms described above or by machine learning algorithms. Thus, the systems and methods provide an improved solution for network function interconnectivity within a network.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

As discussed herein, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing network nodes, BNGs, servers, ANs, CPEs, routers, or other network elements and/or hardware. Such existing hardware may be processing or control circuitry such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUS), one or more microprocessors, one or more Application Specific Integrated Circuits (ASICs), or any other device or devices capable of responding to and executing instructions in a defined manner.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium," "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine-readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks. For example, as mentioned above, according to one or more example embodiments, at least one memory may include or store computer program code, and the at least one memory and the computer program code may be configured to, with at least one processor, cause a network element or network device to perform the necessary tasks. Additionally, the processor, memory and example algorithms, encoded as computer program code, serve as means for providing or causing performance of operations discussed herein.

A code segment of computer program code may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable technique including memory sharing, message passing, token passing, network transmission, etc.

The terms "including" and/or "having," as used herein, are defined as comprising (i.e., open language). The term "coupled," as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

According to example embodiments, network functions, SCPs, data centers, or other network elements, may be (or include) hardware, firmware, hardware executing software or any combination thereof. Such hardware may include processing or control circuitry such as, but not limited to, one or more processors, one or more CPUs, one or more controllers, one or more ALUs, one or more DSPs, one or more microcomputers, one or more FPGAs, one or more SoCs, one or more PLUs, one or more microprocessors, one or more ASICs, or any other device or devices capable of responding to and executing instructions in a defined manner.

Benefits, other advantages, and solutions to problems have been described above with regard to specific embodiments of the invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

What is claimed is:

1. A system for routing a service request in a service based architecture, the system comprising:

at least one processor; and at least one memory storing instructions that, when executed by the at least one processor, cause the system to receive a service request at a first service communication proxy (SCP), the service request being received from a first network function, and the first network function being associated with a data center of the first SCP;

receive quality of service (QoS) requirements of the service request;

receive a list of virtual paths from a SCP repository, each virtual path defining a route for the service request from the first network function to a final network function within the service based architecture; and process, at the first SCP, the service request to determine a virtual path from the list of virtual paths to route the service request from the first network function to a second network function within the service based architecture, wherein the virtual path is determined based on QoS parameters of the service based architecture and the QoS requirement of the service request.

2. The system of claim 1, wherein the at least one memory stores instructions that, when executed by the at least one processor, cause the system to determine the virtual path by selecting a first virtual path from the list of virtual paths that satisfies the QoS parameters and the QoS requirements of the service request.

3. The system of claim 1, wherein the at least one memory stores instructions that, when executed by the at least one processor, cause the system to:

receive a list of updated virtual paths defining routes for the service request from the first network function to a final network function when the QoS parameters for the service based architecture are updated; and determine an updated virtual path, from the list of updated virtual paths, to route the service request from the first network function to the second network function within the service based architecture.

4. The system of claim 3, wherein the QoS parameters are updated when the service request changes a number or type of a network function within the service based architecture, the service request changes a QoS parameter of a SCP of the service based architecture by a threshold percentage, or a topology of the service based architecture changes.

5. The system of claim 1, wherein the at least one memory stores instructions that, when executed by the at least one processor, cause the system to:

establish a connection between the first network function and the second network function to carry out the service request.

6. The system of claim 1, wherein the QoS parameters include at least one of a number of hops, jitter, latency, or packet loss.

7. The system of claim 1, wherein and the second network function is associated with a second data center of a second SCP.

8. A method for routing a service request in a service based architecture, the method comprising:

receiving a service request at a first service communication proxy (SCP), the service request being received from a first network function, and the first network function being associated with a data center of the first SCP;

receiving quality of service (QoS) requirements of the service request;

receiving a list of virtual paths from a SCP repository, each virtual path defining a route for the service request from the first network function to a final network function within the service based architecture; and processing, at the first SCP, the service request to determine a virtual path of the list of virtual paths to route the service request from the first network function to a second network function within the service based architecture, wherein the virtual path is determined based on QoS parameters of the service based architecture and the QoS requirement of the service request.

9. The method of claim 8, further comprising:

determining the virtual path by selecting a first virtual path from the list of virtual paths that satisfies the QoS parameters and the QoS requirements of the service request.

10. The method of claim 8, further comprising:

receiving a list of updated virtual paths defining routes for the service request from the first network function to a final network function when the QoS parameters for the service based architecture are updated; and determining an updated virtual path, from the list of updated virtual paths, to route the service request from the first network function to the second network function within the service based architecture.

11. The method of claim 10, wherein the QoS parameters are updated when the service request changes a number or type of a network function within the service based architecture, the service request changes a QoS parameter of a SCP of the service based architecture by a threshold percentage, or a topology of the service based architecture changes.

12. The method of claim 8, further comprising:

establishing a connection between the first network function and the second network function to carry out the service request.

13. The method of claim 8, wherein the QoS parameters include at least one of a number of hops, jitter, latency, or packet loss.

14. A system for routing a service request in a service based architecture, the system comprising:

at least one processor; and at least one memory storing instructions that, when executed by the at least one processor, cause the system to receive a service request at a service communication proxy (SCP) repository, the service request being received from a first SCP;

process, at the SCP repository, the service request to determine quality of service (QoS) requirements of the service request and an event type created by the service request;

determine a list of virtual paths based on QoS parameters of the service based architecture and the QoS requirements of the service request, each virtual path defining a route for the service request from a first network function of the first SCP to one of a plurality of second network functions within the service based architecture; and send the list of virtual paths from the SCP repository to the first SCP.

15. The system of claim 14, wherein the at least one memory stores instructions that, when executed by the at least one processor, cause the system to:

notify the plurality of second network functions within the service based architecture of the service request.

16. The system of claim 14, wherein the at least one memory stores instructions that, when executed by the at least one processor, cause the system to:

create an updated list of virtual paths based on updated QoS parameters for the service based architecture; and send the updated list of virtual paths to at least the first SCP.

17. The system of claim 16, wherein the updated QoS parameters are generated when the service request changes a number or type of a network function within the service based architecture, the service request changes a QoS parameter of a SCP of the service based architecture by a threshold percentage, or a topology of the service based architecture changes.

18. The system of claim 16, wherein the updated list of virtual paths are created using a machine learning algorithm.

19. The system of claim 14, wherein the QoS parameters include at least one of a number of hops, jitter, latency, or packet loss.

* * * * *